(12) United States Patent
Ambar (10) Patent No.: US 10,567,508 B2
(45) Date of Patent: *Feb. 18, 2020

(54) MEDIA FILE UPLOAD AWARENESS FOR ONLINE SYSTEMS

(71) Applicant: Facebook, Inc., Menlo Park, CA (US)

(72) Inventor: Eran Ambar, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 282 days.

This patent is subject to a terminal disclaimer.

(21) Appl. No.: 15/582,587

(22) Filed: Apr. 28, 2017

(65) Prior Publication Data

US 2018/0314697 A1    Nov. 1, 2018

(51) Int. Cl.
   *G06F 7/00*   (2006.01)
   *H04L 29/08*  (2006.01)
   *G06F 16/174* (2019.01)

(52) U.S. Cl.
   CPC ........ *H04L 67/1097* (2013.01); *G06F 16/174* (2019.01); *H04L 67/06* (2013.01)

(58) Field of Classification Search
   CPC ............. G06F 16/7867; G06F 16/9014; G06F 16/1767; G06F 16/24534; H06F 16/43
   See application file for complete search history.

(56) References Cited

U.S. PATENT DOCUMENTS

| | | | | |
|---|---|---|---|---|
| 8,219,562 B1 * | 7/2012 | Rothschild | ............. | G06F 16/13 707/741 |
| 8,516,074 B2 * | 8/2013 | Courtemanche | .... | H04L 67/1095 709/217 |
| 8,650,164 B2 * | 2/2014 | Rothschild | ............. | G06F 16/13 707/693 |
| 9,113,217 B2 * | 8/2015 | Mallinson | ............. | G06Q 30/02 |
| 9,166,964 B2 * | 10/2015 | Finlayson | ............. | G06F 21/10 |
| 9,311,265 B2 * | 4/2016 | Elboim | ............. | G06F 12/0862 |
| 9,311,365 B1 | 4/2016 | Lu et al. | | |
| 9,773,228 B2 * | 9/2017 | Baldwin | ............... | H04L 67/306 |
| 10,097,654 B2 * | 10/2018 | Zhou | ....................... | H04L 67/22 |
| 2005/0154608 A1 * | 7/2005 | Paulson | ................. | G06Q 10/10 705/52 |
| 2006/0288036 A1 * | 12/2006 | Sadovsky | ............... | G06F 16/41 |
| 2007/0217648 A1 | 9/2007 | Muehlbauer | | |
| 2007/0220592 A1 * | 9/2007 | Muehlbauer | ............ | G06F 21/10 726/4 |
| 2010/0205162 A1 * | 8/2010 | Davis | ...................... | G06F 16/40 707/698 |
| 2012/0109904 A1 * | 5/2012 | Sparks | .................. | G06F 16/435 707/690 |

(Continued)

*Primary Examiner* — Daniel A Kuddus
(74) *Attorney, Agent, or Firm* — Fenwick & West LLP (57) ABSTRACT

An online system stores media files (i.e., stored media files) and receives a user request to upload a video file (i.e., a requested media file). The online system determines whether the requested media file matches one of the stored media files based on hash values. If there is a mismatch in hash value, the online system may determine the match based on fingerprints. If it is determined that the requested media file does not match any stored media file, the online system stores the requested media file. Even if there is a match, the online system compares a quality of the requested media file with the matched media file and replaces the matched media file with the requested media file having a higher quality metric.

14 Claims, 6 Drawing Sheets

(56) References Cited

U.S. PATENT DOCUMENTS

| | | | |
|---|---|---|---|
| 2012/0166532 A1* | 6/2012 | Juan | G06Q 30/0224 |
| | | | 709/204 |
| 2014/0074663 A1 | 3/2014 | Alsina et al. | |
| 2014/0134038 A1* | 5/2014 | Kubota | C01G 53/006 |
| | | | 420/8 |
| 2014/0156360 A1* | 6/2014 | Shalita | G06Q 50/01 |
| | | | 705/14.1 |
| 2014/0156566 A1* | 6/2014 | Kabiljo | G06Q 30/02 |
| | | | 706/12 |
| 2014/0156744 A1* | 6/2014 | Hua | G06Q 30/0251 |
| | | | 709/204 |
| 2014/0358938 A1* | 12/2014 | Billmaier | H04L 67/10 |
| | | | 707/747 |
| 2015/0089019 A1* | 3/2015 | Chou | H04L 67/1097 |
| | | | 709/217 |
| 2015/0156281 A1* | 6/2015 | Krieger | H04L 67/42 |
| | | | 709/203 |
| 2015/0195264 A1 | 7/2015 | Finlayson | |
| 2015/0196264 A1* | 7/2015 | Luo | A61B 6/505 |
| | | | 378/4 |
| 2016/0044015 A1* | 2/2016 | Finlayson | G06F 21/10 |
| | | | 726/4 |
| 2016/0360043 A1* | 12/2016 | Pacifici | H04M 15/8088 |
| 2017/0351733 A1* | 12/2017 | Zhou et al. | G06F 21/6254 |
| 2017/0353564 A1* | 12/2017 | Zhou | H04L 67/22 |
| 2018/0232388 A1* | 8/2018 | Burns | H04L 67/42 |

\* cited by examiner

MEDIA FILE UPLOAD AWARENESS FOR ONLINE SYSTEMS

BACKGROUND

This disclosure relates generally to storing media files online systems, and more particularly to uploading media files (e.g., videos) to online systems while avoiding duplication of the media files at the online systems.

Online systems have become increasingly prevalent in digital content distribution and consumption, and allow users to more easily communicate with one another. Users of an online system associate with other online system users, forming a web of connections. Additionally, users may share personal information and other stories with other users connected to them via an online system. Examples of information shared by online system users include videos, songs, contact information, background information, job information, interests, photos, notes, and/or other member-specific data.

An online system stores media files, such as pictures, video files, audio files, documents, etc., for presenting to users of the online system. An online system user may view, express preference, comment on or share a stored media file. The media files may be uploaded by users of the online system or curated by the online system. For example, an online system allows an online system user to upload media files that are created by the online system user or acquired by the online system user from third-party sources. Thus, an online system user can decide what media files to share with other users connected to the user at the online system, e.g., through a newsfeed of the user. Those other users connected to the user may view, express preference, comment on or share a media file uploaded by the user. Allowing online system users to upload media files in which they are likely to have an interest encourages additional use of the online system by the online system users. However, storing and managing a large corpus of media files at an online system often requires a large amount of computing and storage resources. Online system users may request to upload a media file that is already stored in the online system (e.g., by the same online system user or a different online system user). Accepting any media files for uploading without discretion may lead to inefficient use of computing and storage resources of an online system.

SUMMARY

An online system stores media files (referred to as "stored media files") that can be presented to users of the online system. Also, a user of the online system may request, e.g., via a client device associated with the user, to upload a media file (referred to as "requested media file") to the online system. In some embodiments, the requested media file includes a header section and a content section. To avoid uploading duplicates of media files stored in the online system, the online system determines whether the requested media file matches one of the stored media files. If there is a match, the requested media file is not allowed to be uploaded to the online system unless it has better quality than the matched media file that has already existed in the online system.

In some embodiments, if the online system determines that the requested media file matches a stored media file (i.e., a matched media file), the online system further determines whether the requested media file has a better quality than the matched media file stored at the online system, and stores the requested media file if it has a better quality. The online system determines quality of a media file based on one or more criteria, e.g., bit rate, resolution at frame level and/or macro-block level, with reference files or without reference files. The online system stores the requested media file with a better quality and deletes the corresponding stored media file. Likewise, if the requested media file has a lower quality, the online system deletes the requested media file and saves a reference of the requested media file to the matched stored media file, e.g., a link to the matched stored media file. The online system may send the reference to the matched media file to the client device. The client device can display the reference to the user and allows the user to access the matched video file through the reference.

Examples of media files include images, video files, audio files, documents, etc. For the purpose of illustration, the description below uses video files as an example. However, the disclosure also applies to other types of media files.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
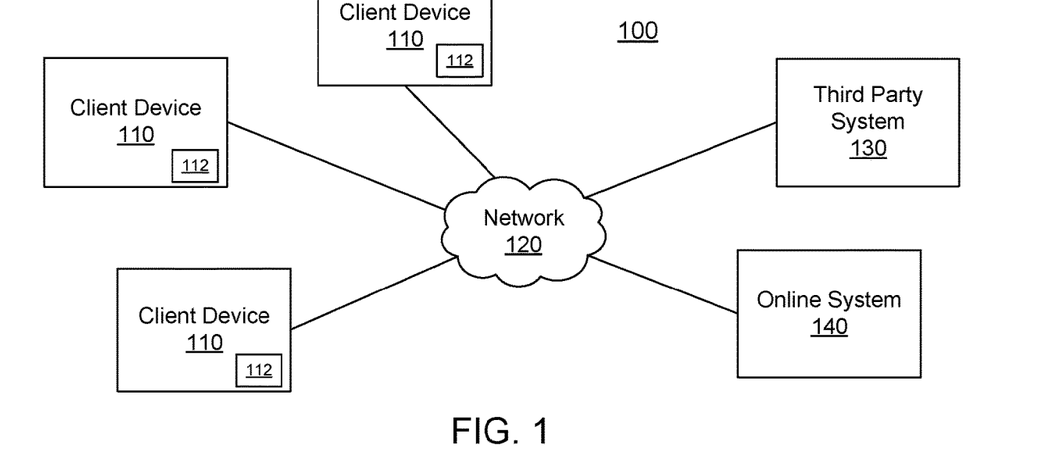
FIG. 1 is a block diagram of a system environment in which an online system operates, in accordance with an embodiment.

FIG. 1 is a block diagram of a system environment 100 in which an online system 140 operates, in accordance with an embodiment. The system environment 100 shown by FIG. 1 comprises one or more client devices 110, a network 120, one or more third-party systems 130, and the online system 140. In alternative configurations, different and/or additional components may be included in the system environment 100. The online system 140 may comprise a social networking system, a content sharing network, or another system providing content to users.

The client devices 110 are computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

In one embodiment, a client device 110 executes a software module 112 for uploading a video file to the online system 140. For example, the software module 112 generates a hash value for each video file to be uploaded to the online system by applying a hash function to a portion (e.g., a header portion) or entire length of the video file. The software module 112 provides the hash value of a video file and an identification of the video file in an upload request to the online system 140. Upon receiving an approval for uploading from the online system 140, the software module 112 uploads the requested video file to the online system 140. In response to receiving a reference to the requested video file (e.g., a URL to the requested video file), the software module 112 stores the references to the requested video file at the client device 110.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

Figure 2:
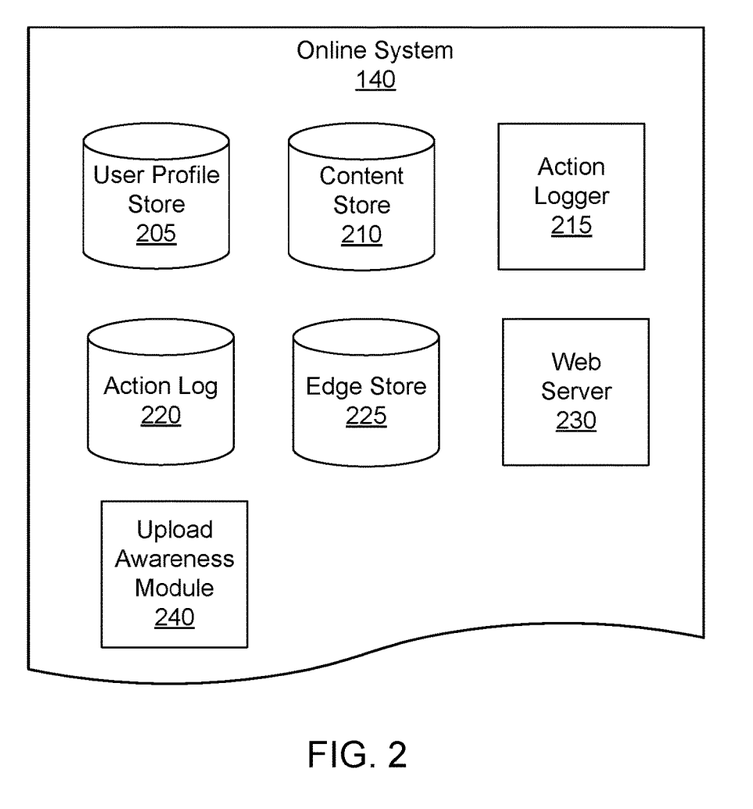
FIG. 2 is a block diagram of an online system having an upload awareness module, in accordance with an embodiment.

FIG. 2 is a block diagram of an online system 140, in accordance with an embodiment. The online system 140 shown in FIG. 2 includes a user profile store 205, a content store 210, an action logger 215, an action log 220, an edge store 225, a web server 230 and an upload awareness module 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220, e.g., uploading media files to the online system 140.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects. Each of the objects represents various types of content. Examples of content represented by an object include an uploaded video file, a page post, a status update, a photograph, a media file (e.g., an image, an audio, a video, or a document), a link, a shared content item, a gaming application achievement, a check-in event at a local business, a brand page, or any other type of content. The content store 210 may also store information describing or otherwise related to the content. For example, the content store 210 can store hash values (e.g., header hash values and content hash values) and fingerprints (e.g., audio fingerprints and video fingerprints) of the stored media files.

Online system users may create objects stored by the content store 210, such as status updates, photos tagged by users to be associated with other objects in the online system 140, events, groups or applications. In some embodiments, objects are received from third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The web server 230 links the online system 140 via the network 120 to the one or more client devices 110, as well as to the one or more third party systems 130. The web server 230 serves web pages, as well as other content, such as JAVA®, FLASH®, XML and so forth. The web server 230 may provide application programming interface (API) functionality to send data directly to native client device operating systems, such as IOS®, ANDROID™, or BlackberryOS. Additionally, the web server 230 may receive and route messages between the online system 140 and the client device 110, for example, instant messages, queued messages (e.g., email), text messages, short message service (SMS) messages, or messages sent using any other suitable messaging technique. A user may send a request, e.g., through a client device 110, to the web server 230 to upload video files. A video file that a user requests to upload is a requested video file. However, the requested video file may be duplicate to one of the plurality of video files stored in the content store 210 (i.e., stored video files). To avoid such duplication, the web server 230 receiving the user request to upload may send the user request to the upload awareness module 240.

The upload awareness module 240 processes the user request for uploading a video file and determines whether to allow upload of a requested video file and whether to store the requested video file, if uploaded, at the content store 210. For example, the upload awareness module 240 determines whether the requested video file matches any of the stored video files. If there is no match, the requested video file is likely a new video file to the online system 140 and is stored at the online system 140. Likewise, if there is a match, the requested video file is not stored at the online system 140. In some embodiments, even there is a match, the upload awareness module 240 compares a quality of the requested video file with the matched video file stored at the online system 140 and replaces the matched video file with the requested video file if the requested video file has a better quality. In this case, the existing matched video file is deleted.

To determine whether the requested video file matches any of the stored video file, the upload awareness module 240 uses various methods. In one embodiment, the upload awareness module 240 determines a match based on hash values of the requested video file and the stored video files. A hash value of a video file is generated from the video file using a hash function and uniquely identifies the video file. A video file can include a header section and a content section. A hash value of the video file can be generated from either the header section (i.e., a header hash value) or the content section (i.e., a content hash value). For example, the upload awareness module 240 compare a header hash value of the requested video file with corresponding header hash values of the stored video files. The header hash value of the requested video file is generated by applying a hash function to a header section of the requested video file that includes metadata describing the requested video file. The header hash value of a video file has much smaller amount of data compared with the original video file. Thus, comparison of header hash values of video files is more efficient than comparison of the whole video files.

An exact match of the header hash value of the requested video file and the header hash value of a stored video file indicates that the requested video file matches the stored video file. The upload awareness module 240 can deny the user's request to upload the requested video file because the online system 140 already has a matching video file. Additionally, the upload awareness module 240 may store a reference to the matched video file (e.g., a URL to the matched video file) and allow the user and/or other online system users to access the matched video file through the reference.

A mismatch of the header hash value of the requested video file and header hash values the stored video files indicates that the requested video file may be a new video file to the online system 140. The upload awareness module 240 can allow the upload of the requested video file. In one embodiments where the header hash value of a video file is generated from only the header portion of the video file, a mismatch based on the header hash values may not necessarily mean that the requested video file and stored video files have different content. For example, a requested video file from a client device has the same video content as a stored video file, but was transcoded once to be suitable for the client device, which results in a different header file than the one for the stored video filed (e.g., different resolutions). The header hash value of the requested video file and the header hash value of the stored video file in this example are different as a result of the different header files, which results in a mismatch between the requested video file and the stored video file based on the header hash value comparison.

The upload awareness module 240 can further determine whether the content of the requested video file matches content of one of the stored video files. In one embodiment, the content match is based on fingerprints of the video files. In another embodiment, the content match is based on hash values of the content of the video files. A content hash value of a video file is a hash value generated from a content section of the video file. Responsive to the content of the request video file not matching content of any of the stored video files based on the content hash values or fingerprints comparison, the upload awareness module 240 determines that the requested video file does not match any of the stored video files. The requested video file can be stored at the content store 210.

A fingerprint of a video file is a compact representation of the characteristic features of content of the video file that can be used to categorize the content and distinguish it from perceptually different video files. A video file can include an audio signal (e.g., audio frames describing the sound of the video file) and a video signal (e.g., a sequence of video frames of the video file). Accordingly, the fingerprint of the video file can be an audio fingerprint generated from the audio signal or a video fingerprint generated from the video signal. Taking audio fingerprint generation as an example, an audio fingerprinting algorithm preprocess the audio signal of a video file by applying one or more operations to the audio signal, such as extracting metadata associated with the audio signal, normalizing the amplitude and dividing the audio signal into multiple audio frames. The audio fingerprinting algorithm further transforms the audio signal by applying a time-to-frequency domain transform (e.g., STFT transform). The transformed audio signal is filtered by splitting each spectral frame of the transformed audio signal into multiple filter banks. Embodiments of the video fingerprinting algorithm extract characteristic features of one or more frames containing the most important and perceptually essential part of the video signal. In one embodiment, the video fingerprinting algorithm detects scene boundaries, selects key frames and extracts features from the selected key frames to generate the video fingerprint.

In one embodiment, the user request includes the header hash value, content hash value or fingerprint of the requested video file. In an alternative embodiment, the upload awareness module 240 generates the header hash value, content hash value or fingerprint of the requested video file and stores them at the online system 140 (e.g., the content store 210).

In some embodiments, even if the requested video file matches a stored video file, the upload awareness module 240 compares a video quality of the request video file with corresponding video quality of the matched video file. Examples of metrics that may contribute to video quality include bit rate, frame rate, and resolution, etc. If the upload awareness module 240 determines that the requested video file has a better quality, the requested video file is stored and the matched video file is deleted from the content store 210. Likewise, if the matched video file is determined to have a better quality, the requested video file is not stored in the content store 210 and a reference to the matched video file in the content store 210 is stored in its place.

Upload Awareness Module

Figure 3:
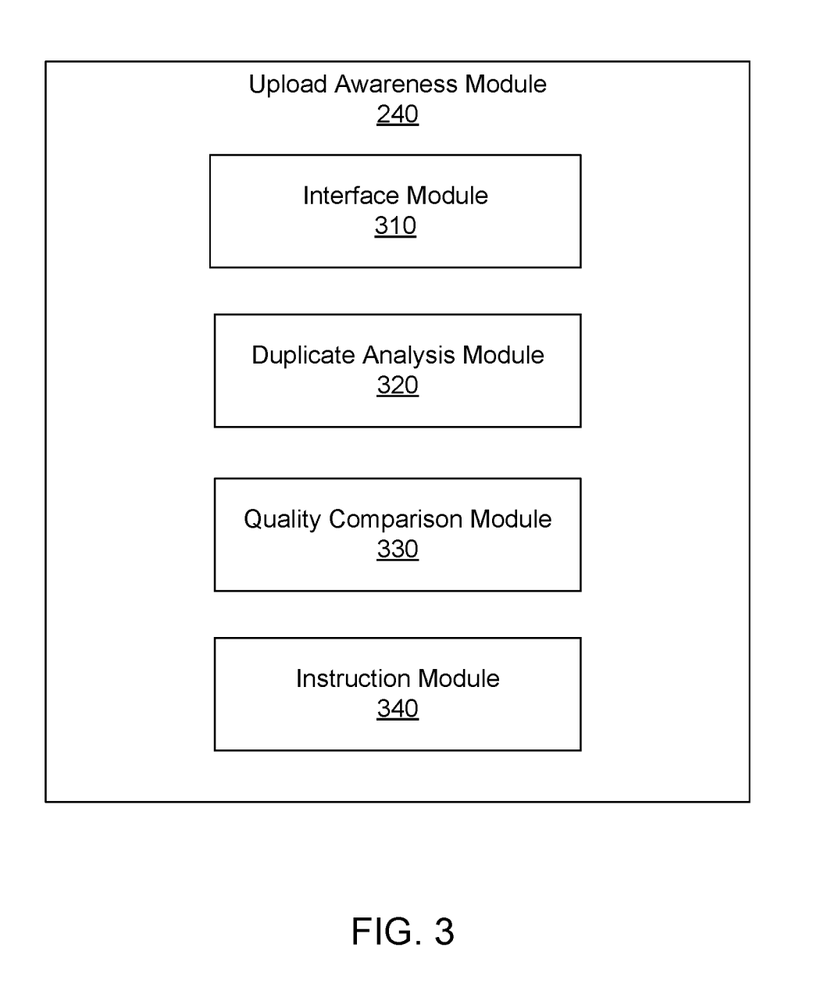
FIG. 3 is a block diagram of an upload awareness module of the online system, in accordance with an embodiment.

FIG. 3 is a block diagram of an upload awareness module 240 included in the online system 140, in accordance with an embodiment. In the embodiment of FIG. 3, the upload awareness module 240 includes an interface module 310, a duplication analysis 320, a quality comparison module 330 and a instruction module 340. In other embodiments, the upload awareness module 240 may include additional, fewer, or different components for various applications.

The interface module 310 facilitates communication among other entities of the upload awareness module 240, the web server 230 and the content store 210. For example, the interface module 310 receives a user request to upload a video file from the web server 230 or from a client device 110 and sends the user request to the duplicate analysis module 320 and/or the quality comparison module 330 to process the user request. The user request can include an identification of the requested video file and information describing the requested video file, such as hash values and/or fingerprints of the requested video file. Also, the interface module 310 can send storing instruction to the content store 210 for storing video files or other types of data that the upload awareness module 240 determines to store.

The duplicate analysis module 320 processes the user request received from the interface module 310 and determines whether the requested video file in the user request matches any of the stored video files. For example, the duplicate analysis module 320 compares a hash value of the requested video file with corresponding hash value of each of the stored video files.

Figure 4:
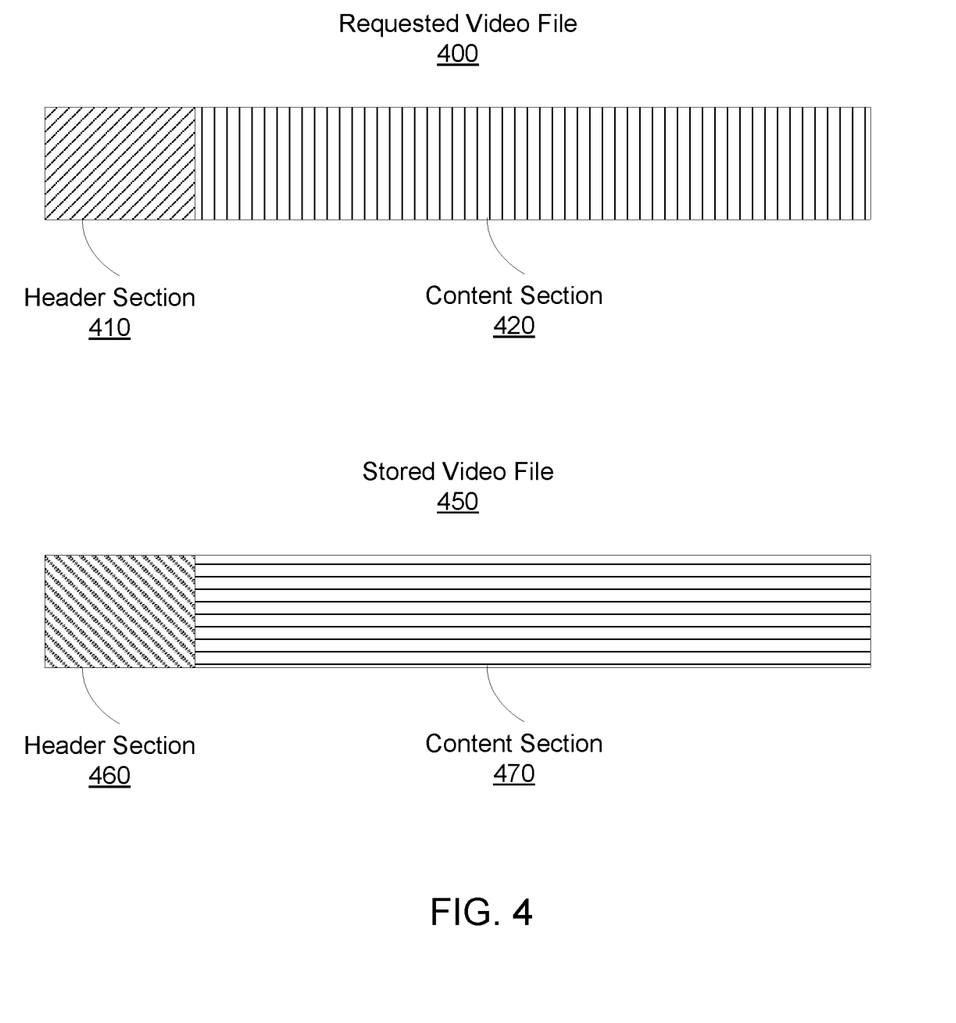
FIG. 4 is file structure diagram illustrating an example of a requested video file and a stored video file, in accordance with an embodiment.

FIG. 4 is file structure diagram illustrating an example of a requested video file 400 and a stored video file 450, in accordance with an embodiment. The requested video file 400 includes a header section 410 and a content section 420. The stored video file 450 includes a header section 460 and a content section 470. The header section 410 or 460 includes metadata of the corresponding video file 400 or 450. Metadata of a video file includes information describing the video file. For example, the metadata of a video file includes information about time (e.g., when the video file is created or modified), location (e.g., where the video file is created), description of content of the video file, identification of the video file, keywords/tags of the video file, identity of a person who created or modified the video file, source of the video file (e.g., publisher and distributor of the video file), size of the video file, compression format of the video file (e.g., MPEG-4, H.264, H.265), frame rate, resolution, audio file format of companying audio of the video file, security encryption method, and the like. Accordingly, the metadata of a video file can be used to describe and identify the video file. The metadata can be used to generate a hash value of the video file (i.e., a header hash value) using a hash function.

The content section 420 or 470 includes content of the corresponding video file 400 or 450. Content of a video file includes a sequence of video frames and may also include audio. The content, e.g., the frames and/or the audio, can be used to generate a hash value of the video file (i.e., a content hash value) using a hash function. The hash function for the content hash value may be same or different from the hash function of the header hash value. Any known hash functions, e.g., MD5, can be used to generate header/content hash values of a video file.

In some embodiments, the header hash value of the requested video file 400 may be generated by the client device 110 that is associated with the user who requested to upload the requested video file 400. For example, the client device 110 sends the header hash value of the requested video file 400 together with the user request. The client device may use a hash function specified by the online system 140, which can be the same hash function that the online system uses to generate hash values of the stored video file 450.

In some other embodiment, the header hash value of the requested video file 400 may be generated by the online system 140, e.g., the upload awareness module 240. For example, the upload awareness module 240, receiving the user request, accesses or requests the header section 410 of the requested video file 400 and generates the header hash value from the metadata in the header section 410. The online system can also generate the content hash value of the requested video file 400 upon receiving the requested video file.

Turning back to FIG. 3, the duplicate analysis module 320 can start with comparing a header hash value of the requested video file with header hash values of the stored video files. An exact match of the header hash value of the requested video file 400 and a header hash value of a stored video file can indicate that the two video files match. A mismatch of the header hash value of the requested video file and a header hash value of each stored video file indicates that the requested video file is not identical (including the header sections 410, 460) to any stored video file. However, it is possible that the requested video file has the same content sections 420, 470 as one of the stored video files but with different header sections 410, 460 as described above.

The duplicate analysis module 320 can further compare a content hash value of the requested video file with content hash values of the stored video files based on video frames and/or audio frames of the requested video file and the stored video files. If the content hash value of the requested video file does not match the content hash value of any stored video file, the requested video file has different content from any of the stored video files. An exact match of the content hash value of the requested video file with the content hash value of a stored video file indicates that the requested video file has the same content as the stored video file.

In some embodiments, the duplicate analysis module 320 compares a fingerprint of the requested video file with corresponding fingerprints of the stored video files. The fingerprint of the requested video file can be generated by the client device 110 or the online system 140, e.g., the duplicate analysis module 320, using a fingerprinting algorithm. The requested video file can include an audio signal (e.g., audio frames describing the sound of the video file) and a video signal (e.g., a sequence of video frames of the video file). Accordingly, the fingerprint of the requested video file can be an audio fingerprint generated from the audio signal or a video fingerprint generated from the video signal.

To match the audio fingerprint of the requested video file to the audio fingerprint of a stored video file, the duplicate analysis module 320 calculates correlation between the audio fingerprint of the requested video file and an audio fingerprint of a stored video file. The correlation between the two audio fingerprints measures a degree of match in audio characteristics between the two audio fingerprints. Examples of correlation calculation between two audio fingerprints can be found from patent application Ser. No. 14/153,404.

The generated audio and/or video fingerprint of the requested video file can be stored at the online system 140, e.g., the content store 210. The duplicate analysis module 320 compares the fingerprint of the requested video file with corresponding fingerprint of stored video files. For example, the duplicate analysis module 320 measures similarity between the fingerprint of the requested video file and the fingerprint of each stored video file. If the similarity measure between the requested video file and a stored video file is above a threshold value, the duplicate analysis module 320 determines that the requested video file matches the stored video file (i.e., matched video file).

The quality comparison module 330 determines whether the requested video file has a better quality than the matched video file. For example, the quality comparison module 330 compares video quality of the two video files based on video quality evaluation. Examples of video quality evaluation include measurement of bit rate, resolution, perceptual quality at frame level and/or macro-block level. The quality comparison module 330 can apply various video quality evaluation methods to evaluate quality of the requested video file and the matched video file stored at the online system 140, including full reference methods, reduced reference methods, pixel-based methods, and combination of thereof.

The instruction module 340 generates uploading and/or storing instructions based on determination of the duplicate analysis module 320 and the quality comparison module 330. For example, when the duplicate analysis module 320 determines that the header hash value of the requested video file matches the header hash value of a stored video file, the instruction module 340 generates an instruction for storing a reference to the stored video file and another instruction for not allowing the upload of the requested video file. In another example, when the duplicate analysis module 320 determines that the header hash value of the requested video file does not match the header hash value of a stored video file, the instruction module 340 generates an instruction for allowing the upload of the requested video file.

When it is determined that the content of the uploaded video file does not match content of any of the stored video file or the uploaded video file has a higher quality than a matched video file, the instruction module 340 generates an instruction for storing the uploaded video file at the online system 140. Likewise, the instruction module 340 can generate the instruction for storing a reference to the stored video file and deleting the uploaded video file (i.e., the requested video file) when it is determined that the content of the uploaded video file matches content of a stored video file. In some embodiments, when the uploaded video file is determined to have a better quality than the matched video file, the instruction module 340 generate an instruction for replacing the matched video file with the uploaded video file.

The uploading instructions can be sent, e.g., via the interface module 310, to the client device 110. The storing instructions can be sent, e.g., via the interface module 310, to the content store 210 where the reference to the stored video file is stored.

Upload Awareness Processes

Figure 5:
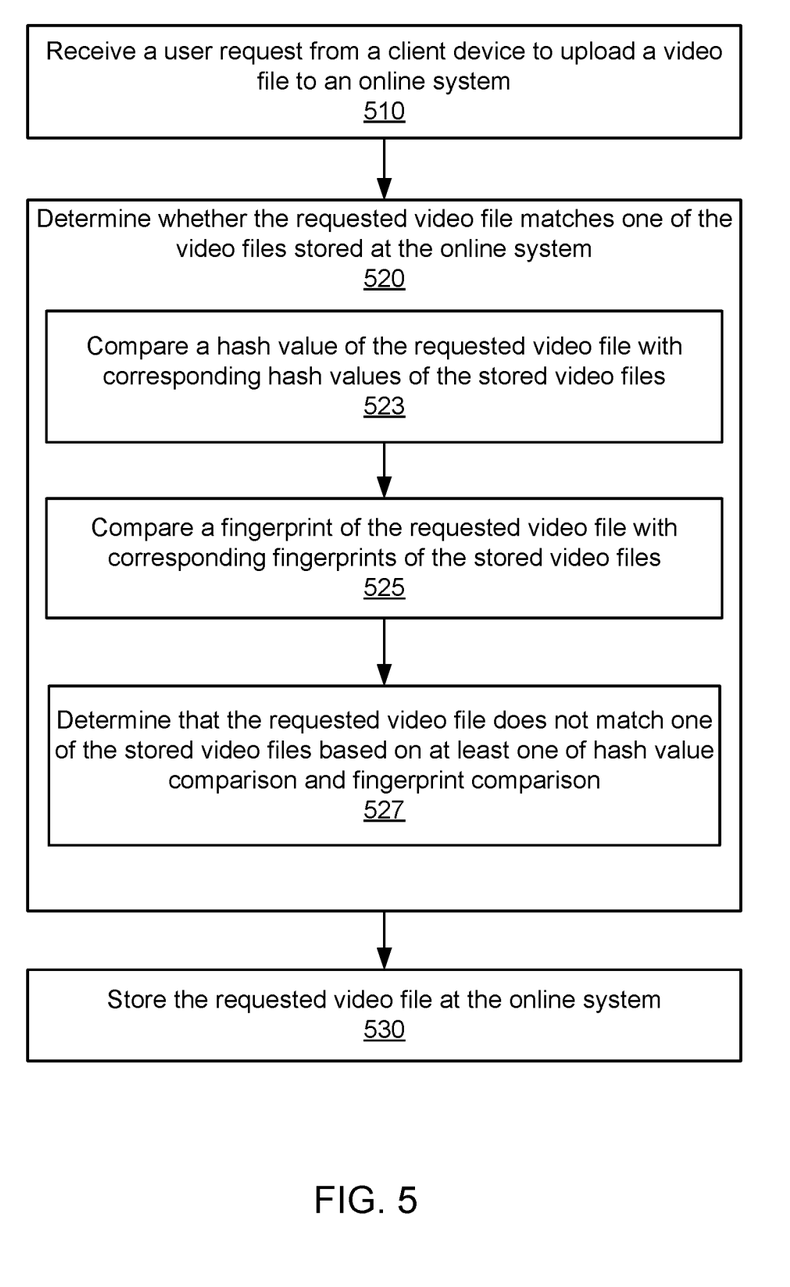
FIG. 5 is a flowchart illustrating a process for storing a non-duplicate video file uploaded by a user at the online system, in accordance with an embodiment.

FIG. 5 is a flowchart illustrating a process for storing a non-duplicate video file uploaded by a user at the online system 140. In some embodiments, the process is performed by the upload awareness module 240 of the online system 140, although some or all of the operations in the method may be performed by other entities in other embodiments. In some embodiments, the operations in the flow chart are performed in a different order and can include different and/or additional steps.

The upload awareness module 240 receives 510 a user request from a client device 110 to upload a video file (i.e., requested video file) to the online system 140. The online system 140 stores a corpus of video files (i.e., stored video files) uploaded by its users or curated by itself and information about the stored video files, such as hash values and fingerprints. The upload awareness module 240 determines 520 whether the requested video file matches one of the video files stored at the online system 140. In an embodiment, the determination 520 includes three sub-steps. First, the upload awareness module 240 compares 523 a hash value of the requested video file with corresponding hash values of the stored video files. Second, the upload awareness module 240 compares 525 a fingerprint of the requested video file with corresponding fingerprints of the stored video files. Third, the upload awareness module 240 determines 527 that the requested video file does not match one of the stored video files based on at least one of hash value comparison and fingerprint comparison. Steps 523, 525, and 527 may occur in a different sequence. For example, the upload awareness module 240 compares fingerprints before it compares hash values. Upon determination that the requested video file does not match one of the stored video files, the upload awareness module 240 stores 530 the requested video file at the online system 140.

Figure 6:
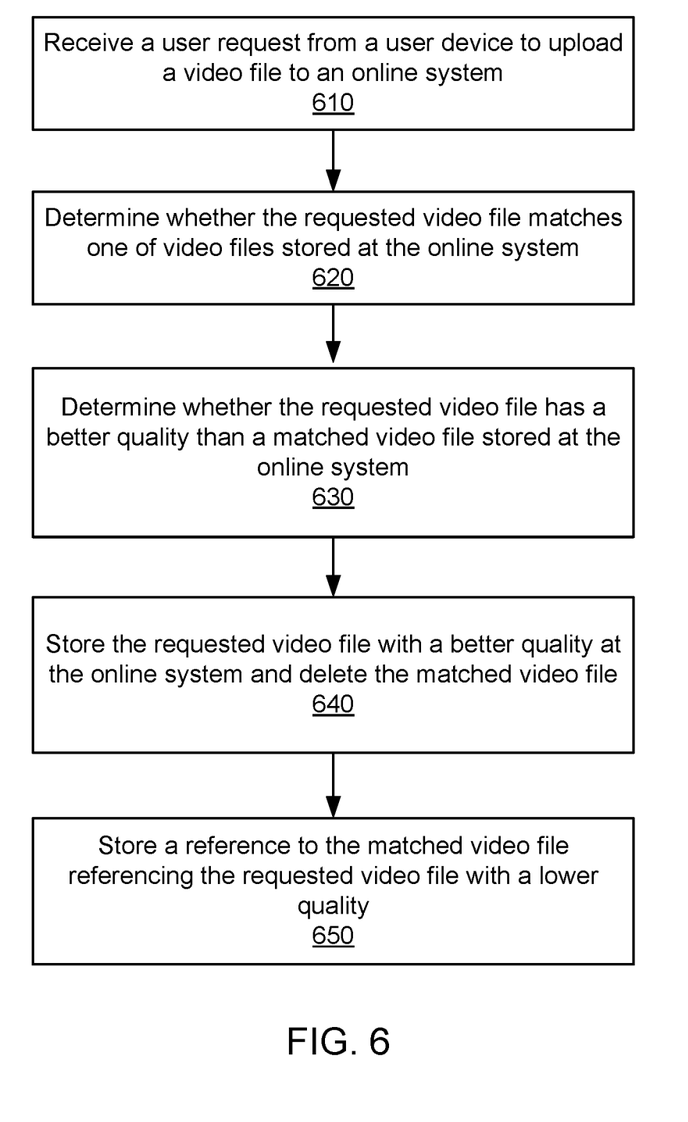
FIG. 6 is a flowchart illustrating a process for storing a better quality video file uploaded by a user at the online system, in accordance with an embodiment.

FIG. 6 is a flowchart illustrating a process for storing a duplicate but better quality video file uploaded by a user at the online system 140. In some embodiments, the process is performed by the upload awareness module 240 of the online system 140, although some or all of the operations in the method may be performed by other entities in other embodiments. In some embodiments, the operations in the flow chart are performed in a different order and can include different and/or additional steps.

The upload awareness module 240 receives 610 a user request from a client device 110 to upload a video file (requested video file) to the online system 140. The upload awareness module 240 determines 620 whether the requested video file matches one of a plurality of video files stored at the online system 140 (stored video file). In one embodiment, the upload awareness module 240 compares one or more hash values of the requested video file with corresponding hash values of each stored video file. Examples of hash values include a header hash value that is generated from metadata of a video file and a content hash value that is generated from content of a video file. In another embodiment, the upload awareness module 240 can compare a fingerprint of the requested video file (e.g., an audio fingerprint or video fingerprint or both) with corresponding fingerprints of each stored video file. If the hash values and/or fingerprint of the requested video file match a stored video file, the upload awareness module 240 determines that the requested video file matches the stored video file. Likewise, if a hash value and/or fingerprint of the requested video file do not match any stored video file, the upload awareness module 240 determines that the requested video file does not match any of the stored video files.

The upload awareness module 240 determines 630 whether the requested video file has a better quality than the matched video file stored at the online system 140. If the upload awareness module 240 determines that the requested video file has a better quality, the upload awareness module 240 stores 640 the requested video file at the online system 140 (e.g., the content store 210) and deletes the matched video file. If the upload awareness module 240 determines that the matched video file has a better quality, the upload awareness module 240 stores 650 a reference to the matched video file linking the requested video file with a lower quality to the matched video file. The reference to the stored video file can be presented to the user requesting the upload and/or other online system users that are connected with the user.

Figure 7:
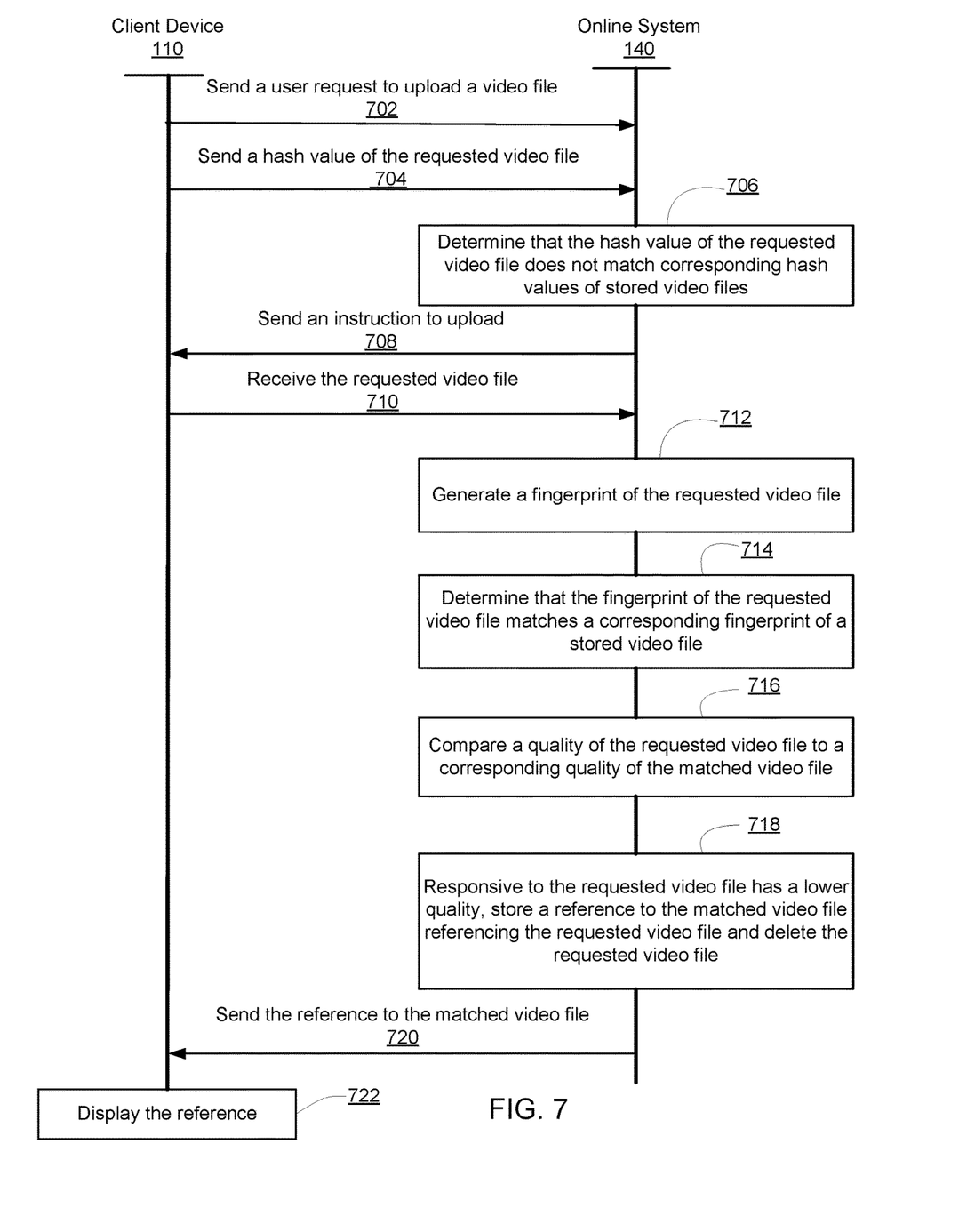
FIG. 7 is an interaction diagram between a client device and the online system for determining whether to upload a video file from the client device to the online system, in accordance with an embodiment.

FIG. 7 is an interaction diagram between a client device 110 and the online system 140 for determining whether to upload a video file from the client device to the online system, in accordance with an embodiment. In some embodiments, the operations in the interaction diagrams are performed in a different order and can include different and/or additional steps.

The client device 110 sends 702 a user request to upload a video file to the online system 140. The client device 110 also sends 704 a hash value of the video file to the online system 140. In one embodiment, the client device 110 generates the hash value from metadata of the video file. Alternatively, the client device 110 may acquire the hash value from a third party. The online system 140 determines 706 that the hash value of the requested video file does not match corresponding hash values of video files stored at the online system 140 (i.e., stored video files). The online system 140 sends 708 an instruction to the client device 110 to upload the requested video file. The online system 140 receives 710 the requested video file. The online system 140 generates 712 a fingerprint of the requested video file. The generation of the fingerprint may require the online system 140 to access content of the requested video file. The fingerprint can be an audio fingerprint or a video fingerprint. In some embodiment, the online system 140 generates both an audio fingerprint and a video fingerprint for the uploaded video file.

The online system 140 determines 714 that the fingerprint of the requested video file matches a corresponding fingerprint of a stored video file. The online system 140 compares 716 a quality of the requested video file to a corresponding quality of the matched video file. Examples of the quality include bit rate and resolution at frame level and/or macroblock level. Responsive to the requested video file has a lower quality (or the same quality), the online system 140 stores 718 a reference to the stored video file referencing the requested video file and deletes the requested video file. The online system 140 sends 720 the reference to the stored video file to the client device 110. The client device 110 displays 722 the reference to the stored video file. Accordingly, the user may access the stored video file, which has the same content as the requested video file but has a better quality.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method, comprising:
   receiving, by an online system, a user request to upload a media file to the online system, wherein the online system stores a plurality of media files, each of the requested medial file and the plurality of the stored media files comprising a header portion and a content portion, the header portion of a media file comprising metadata that describes the media file;
   determining whether the header portion and the content portion of the requested media file are respectively identical to the header portion and the content portion of one of the plurality of stored media files by:
      comparing a hash value of only a header portion of the requested media file with a hash value of only a header portion of each of the plurality of the stored media files, and
      determining whether a similarity measure between a fingerprint of the requested media file and a corresponding fingerprint of each of the plurality of the stored media file is above a threshold value;
   responsive to the header portion and the content portion of the requested media file being respectively identical to the header portion and the content portion of a stored media file, determining whether the requested media file has a higher quality metric than the stored media file, wherein the higher quality metric is selected from a group consisting of a higher bit rate, a higher frame rate, and a higher resolution; and responsive to the requested media file having a higher quality metric than the stored media file, replacing the stored media file with the requested media file.

2. The method of claim 1, further comprising:

responsive to the requested media file having a lower quality metric than the stored media file, storing a reference to the stored media file.

3. The method of claim 1, determining whether the requested media file has a higher quality metric than the stored media file:

comparing a bit rate of the requested media file and a bit rate of the stored media file.

4. The method of claim 1, determining whether the requested media file has a higher quality metric than the stored media file:

comparing a resolution of the requested media file at frame level and a resolution of the stored media file at frame level.

5. The method of claim 1, further comprising:

responsive to the requested media file having a higher quality metric than the stored media, generating an instruction to upload the requested media file.

6. The method of claim 1, further comprising:

responsive to the header portion and the content portion of the requested media file being respectively identical to the header portion and the content portion of a stored media file, deleting the stored media file.

7. A computer program product comprising a non-transitory computer readable storage medium having instructions encoded thereon that, when executed by a processor, cause the processor to:

receive, by an online system, a user request to upload a media file to the online system, wherein the online system stores a plurality of media files, each of the requested medial file and the plurality of the stored media files comprising a header portion and a content portion, the header portion of a media file comprising metadata that describes the media file;

determine whether the header portion and the content portion of the requested media file are respectively identical to the header portion and the content portion of one of the plurality of stored media files by:

comparing a hash value of only a header portion of the requested media file with a hash value of only a header portion of each of the plurality of the stored media files, and determining whether a similarity measure between a fingerprint of the requested media file and a corresponding fingerprint of each of the plurality of the stored media file is above a threshold value;

responsive to the header portion and the content portion of the requested media file being respectively identical to the header portion and the content portion of a stored media file, determine whether the requested media file has a higher quality metric than the stored media file, wherein the higher quality metric is selected from a group consisting of a higher bit rate, a higher frame rate, and a higher resolution; and responsive to the requested media file having a higher quality metric than the stored media file, replace the stored media file with the requested media file.

8. The computer program product of claim 7, having further instructions that, when executed by the processor, cause the processor to:

responsive to the requested media file having a lower quality metric than the stored media file, store a reference to the stored media file.

9. The computer program product of claim 7, wherein the instructions for determining whether the requested media file has a higher quality metric than the stored media file comprise instructions that, when executed by a processor, cause the processor to:

compare a bit rate of the requested media file and a bit rate of the stored media file.

10. The computer program product of claim 7, wherein the instructions for determining whether the requested media file has a higher quality metric than the stored media file comprise instructions that, when executed by a processor, cause the processor to:

compare a resolution of the requested media file at frame level and a resolution of the stored media file at frame level.

11. The computer program product of claim 7, having further instructions that, when executed by the processor, cause the processor to:

responsive to the requested media file having a higher quality metric than the stored media, generate an instruction to upload the requested media file.

12. The computer program product of claim 7, having further instructions that, when executed by the processor, cause the processor to:

responsive to the header portion and the content portion of the requested media file being respectively identical to the header portion and the content portion of a stored media file, delete the stored media file.

13. A computer system, comprising:

a non-transitory computer-readable storage medium storing executable computer program instructions, the computer program instructions comprising instructions that when executed cause a computer processor to perform steps, comprising:

receiving, by an online system, a user request to upload a media file to the online system, wherein the online system stores a plurality of media files, each of the requested medial file and the plurality of the stored media files comprising a header portion and a content portion, the header portion of a media file comprising metadata that describes the media file;

determining whether the header portion and the content portion of the requested media file are respectively identical to the header portion and the content portion of one of the plurality of stored media files by:

comparing a hash value of only a header portion of the requested media file with a hash value of only a header portion of each of the plurality of the stored media files, and determining whether a similarity measure between a fingerprint of the requested media file and a corresponding fingerprint of each of the plurality of the stored media file is above a threshold value;

responsive to the header portion and the content portion of the requested media file being respectively identical to the header portion and the content portion of a stored media file, determining whether the requested media file has a higher quality metric than the stored media file, wherein the higher quality metric is selected from a group consisting of a higher bit rate, a higher frame rate, and a higher resolution; and responsive to the requested media file having a higher quality metric than the stored media file, replacing the stored media file with the requested media file.

14. The system of claim 13, wherein the steps performed by the computer processor further comprise:

responsive to the requested media file has a higher quality metric than the stored media, generating an instruction to upload the requested media file.

* * * * *